United States Patent [19]
Renger et al.

[11] Patent Number: 5,504,753
[45] Date of Patent: Apr. 2, 1996

[54] CONTROL METHOD FOR A TESTING SYSTEM

[75] Inventors: Wolfgang Renger; Richard Waldhauser, both of Munich, Germany

[73] Assignee: Siemens Aktiengesellschaft, Munich, Germany

[21] Appl. No.: 93,954

[22] Filed: Jul. 21, 1993

[30] Foreign Application Priority Data

Jul. 30, 1992 [EP] European Pat. Off. .............. 92113023

[51] Int. Cl.⁶ .............................. H04M 1/24; H04M 3/22
[52] U.S. Cl. ................................ 371/20.1; 379/1; 379/10; 379/27; 379/29
[58] Field of Search .................................. 370/13; 379/12, 379/27, 10, 22, 29, 1, 15, 28; 371/20.1, 20.4, 15.1

[56] References Cited

U.S. PATENT DOCUMENTS

| | | | |
|---|---|---|---|
| 4,484,030 | 11/1984 | Gavrilovich | 379/27 X |
| 4,581,493 | 4/1986 | Gazzo et al. | 379/12 |
| 4,611,320 | 9/1986 | Southard | 370/13 |

OTHER PUBLICATIONS

"Control Strategy of Integrated Testing Technology For The EWSD Periphery", Bert Eisl et al, Telcom Report 8 (1985) No. 1, pp. 25–31; and English translation [Summary] of p. 25.
"Automatic Measurement of the Operating Quality in the EWSD Digital Switching System", Richard Schlag et al, Telcom Report 8 (1985) No. 6, pp. 367–371; English translation [Summary] p. 367.
"Draft Recommendation 0.93B: B–ISDN User–Network Interface Layer 3 Specification for Basic Call/Bearer Control", Geneva, Switzerland, Sep. 23, 1991, Sections 1.0.0.0 to 5.6.0.0 and 9.2.1, 9.2.2.

Primary Examiner—Emanuel T. Voeltz
Assistant Examiner—M. Kemper
Attorney, Agent, or Firm—Hill, Steadman & Simpson

[57] ABSTRACT

For control of a testing system, a test module control program module (TUC) arranged on a line trunk group (LTG) in a process-controlled telecommunications system (K) is connected to a unit under test (TA, TS, TL . . . ) via a testing unit (TU) subdivided into test modules (FTEM, LMEM, LVMM) and implements testing procedures. The line-oriented test module control program module (TUC) initiated by a central control program module (TLFI) controls the routines to be implemented at the testing system for seizing and releasing the testing unit (TU). The test module control program module (TUC) is entered into every device memory table (DPS) belonging to the testing unit (TU) and, when called in, respectively implements a specific test procedure. In the execution phase, the test module control program module (TUC) remains in a defined status. The test routines are implemented and monitored without active participation of the test module control program module (TUC). During the seizure and release phases, the test module control program module (TUC) passes through specific (intermediate) statuses, whereby the DPS status entries of the respectively passive programs are updated at the end.

12 Claims, 5 Drawing Sheets

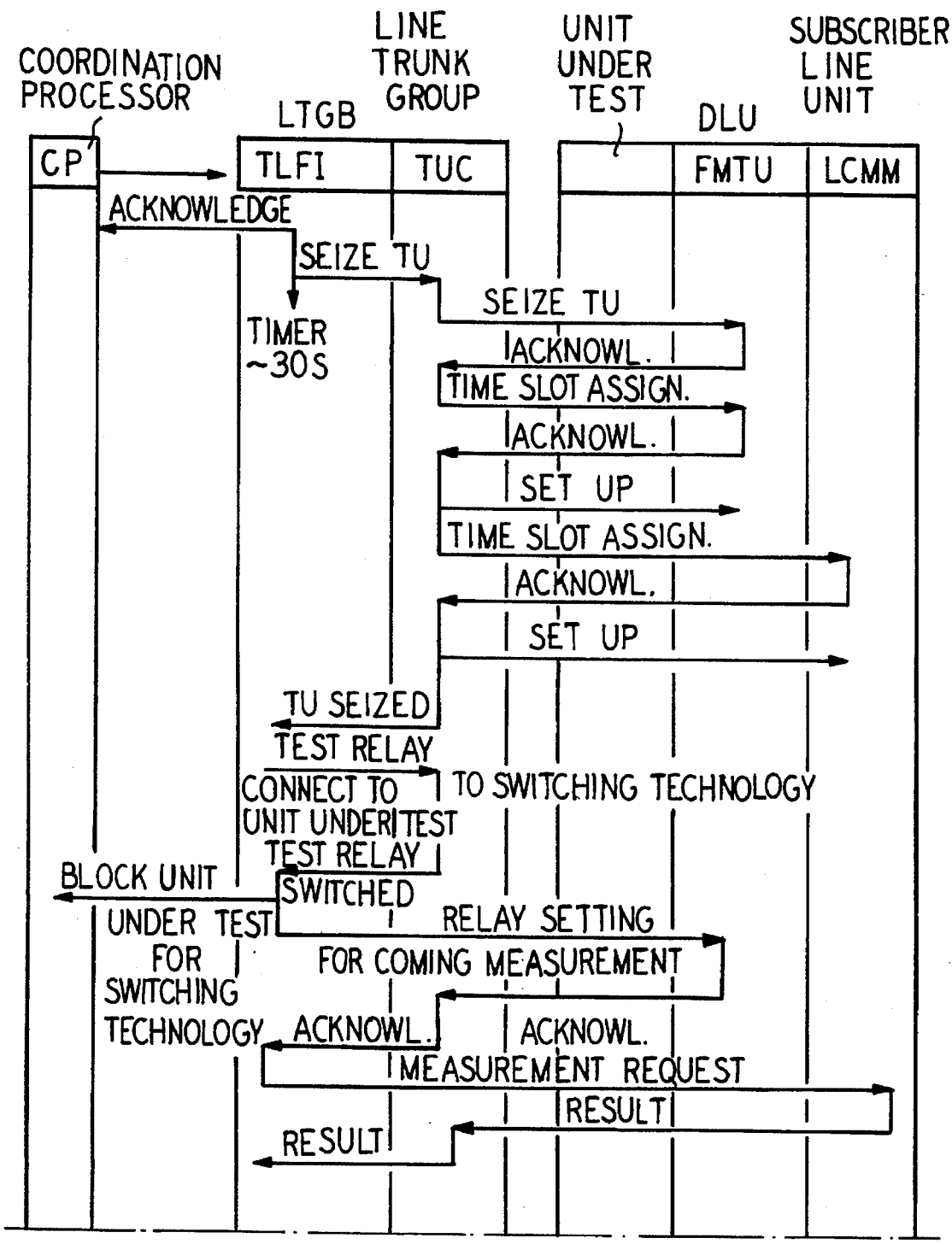

CONTROL METHOD FOR A TESTING SYSTEM

BACKGROUND OF THE INVENTION

The present invention is directed to a control method for a testing system in a processor-controlled telecommunications system.

A functionally reliable telecommunications port is an important requisite for a telecommunications subscriber to reliably use the services and performance features of a telecommunications network or telecommunications system. The hardware and software components necessary for a testing of a telecommunications port are integrated in an electronic dial system. In detail, process-controlled tests such as, for example, error recognition, error diagnosis or error localizing in a subscriber circuit/subscriber circuit module, a subscriber terminal equipment or a subscriber line can be implemented with the electronic hardware and software components integrated in the system. Furthermore, the telecommunications system provides for automatic testing of a telecommunication port, that, for example, can be initiated via a subscriber line circuit itself. The above-identified tests integrated in the system are centrally controlled by a processor a line/trunk group that is arranged between a switching network and a subscriber line unit of a telecommunications system. Several different procedures, initiated by events, are, for example: acceptance of commands from a coordination processor, sending messages to a coordination processor, connect testing access onto a unit under test (for example, subscriber line circuit), seize testing equipment, and implement test.

The events can be essentially subdivided into three types of event: commands/messages, peripheral events and internal events. Event recognition procedures as well as procedures initiated by events are controlled by the operating system of a processor. Respective test procedures are implemented by central control program modules given a subscriber circuit testing, a manual subscriber line testing or an automatic testing. These central control program modules are implemented in the group processor of a line/trunk group. The control program modules work according to the principle of a status/event machine, i.e. different jobs are implemented by the sub-program routines noted in program modules and initiated by events, dependent on the respective program status. Caused by a multiple occupation of an input by test modules of a test unit, an additional, complex event processing as well as administration outlay are added to a complex functioning of the control program module. Given a test request, initiated by a coordination processor, the central control program module is informed of the input of the subscriber unit to be tested at the subscriber line unit. It is not the switching technology that is responsible for the input of the subscriber line unit in this status but, rather, the testing technology, whereby a switching-oriented program module type noted in a device memory table is replaced by a test program module type. An unambiguous test module allocation on the basis of the multiple occupation of an input by this requires a high, complex administration and control outlay. Further, complex program module structures are required in order to initiate a testing procedure, for example a subscriber line circuit test, proceeding from the subscriber line circuit, as well as to implement testing procedures integrated in the system given an event processing.

SUMMARY OF THE INVENTION

It is an object of the present invention to provide a control of a testing system that allows a reduction of the complex administration and control outlay.

This object is inventively achieved by a control method for a testing system in a processor-controlled telecommunications system, whereby at least one central control program module is arranged on a line trunk group and connected via a testing unit subdivided into test modules to a unit under test and executes test procedures. A line-oriented test module control program module is initiated by the central control program module. The test module control program module is entered into each of the device memory tables belonging to the test modules and data of a testing procedure is available given call-in of a program module executing a specific test procedure. The test module control program module in the implementation phase updates the respectively current program status in the device memory tables of the passive test modules after the conclusion of the testing routine.

Advantageous developments of the present invention are as follows. The test module control program module communicates with the test modules arranged on the line trunk group and initiates as well as implements corresponding test procedures.

The test module control program module is time-monitored by the central control program module.

The individual test jobs are implemented such that they are controlled in state-event fashion.

The device memory tables belonging to the testing unit are updatable memories.

On the basis of a test module control program module that implements test procedures, the present invention yields the advantage that all events transmitted from or emanating from the test modules are received, evaluated or forwarded via an internal interface to the central control module, whereby the individual steps for seizing and releasing the hardware as well as software required for the testing are handled and monitored. The test module control program module thereby processes events from the periphery (for example, test modules), from the central controller (internal events), and from the operating system itself, in specific situations. A time-intensive evaluation or a source identification of the events is eliminated. Binding the test module control program module to the central control module leads to a significant relief in the dynamic stress of the operating system. Seen from the point of view of the central controller, the test unit control program module can be considered to be a functional unit and can be initiated with a few "high priority" instructions. It is a substantial implication in the processing of events that the test module control program module can access operation tables of the operating system, this yielding the advantage that time-intensive initialization measures given the assistance of sub-program routines are eliminated. Furthermore, new testing procedures for internally or externally arranged module units to be tested can be rapidly integrated into the test unit control program module.

It is a further development of the present invention that the test module control program module is chronologically monitored by a testing unit. This yields the advantage that, given errors within a testing cycle, this is immediately recognized by the central controller of a test module and the test procedure is ended with a defined final status and corresponding messages to a subscriber line circuit testing location.

Another advantageous development of the present invention is that, after the conclusion of a testing routine, the respective program status is updated in the device memory tables of the passive test unit modules. This yields the advantage that a dynamic load of the operating system is substantially reduced.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 4A and 4B depict a flowchart for illustrating a few significant program-oriented steps during a testing routine.

DESCRIPTION OF THE PREFERRED EMBODIMENT

Figure 1:
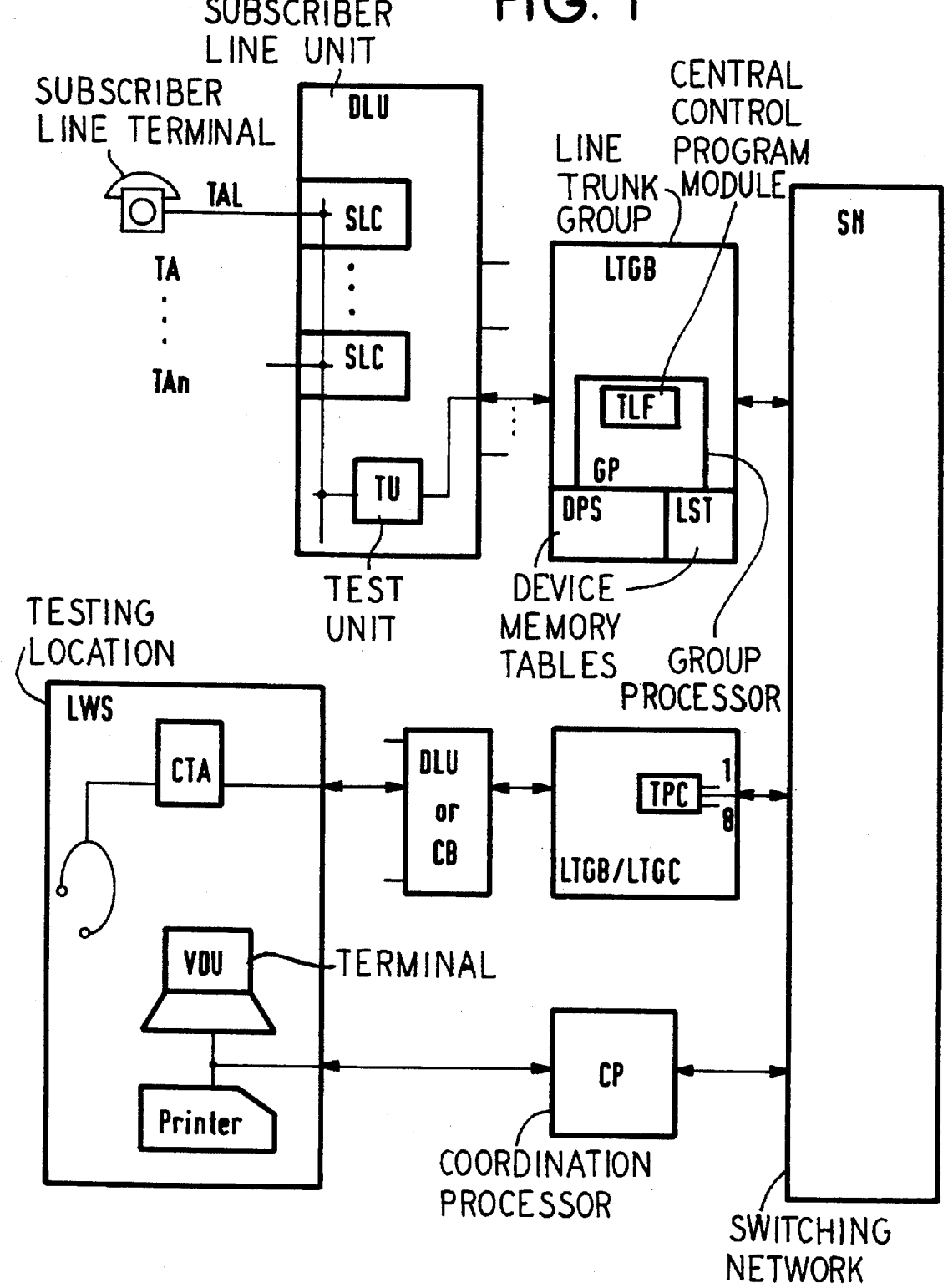
FIG. 1 is a schematic illustration of the testing system.

FIG. 1 shows a schematic illustration of a testing system integrated in a telecommunications system. The testing of a subscriber line terminal TA can thereby be initiated either from a subscriber line terminal test location LWS or by the subscriber line terminal TA via what is referred to as a ringback service (RBS) (See FIG. ). The ringback service (RBS) serves as an automatic testing location partner for a maintenance technician for testing subscriber lines TAL and subscriber line terminals TAn. In a ringback service RBS, the subscriber equipment TA is seized by a testing unit TU in the subscriber line unit DLU (also see FIG. 2 as well as the description thereof). When a subscriber line circuit/ subscriber circuit module, a subscriber terminal equipment or a subscriber line is tested by the subscriber line circuit testing location LWS, the call setup between the testing location LWS and the unit under test is produced by inputting a test command, for example START LTEST, at the terminal VDU via a coordination processing CP. The coordination processor CP transfers the test request to the respective group processor GP that is arranged on a line/ trunk group LTGB. The call setup to the unit under test TU is controlled by a group processor GP to whose area the subscriber line circuits TA or subscriber circuit to be tested belongs. A central control program module TLFI is implemented for this purpose in the group processor GP. This central control program module is oriented according to line/trunk group lines and implements specific conversion functions for integrated subscriber line tests. After a call setup between a subscriber line circuit or a subscriber circuit to be tested and the subscriber line circuit testing location LWS, the central control program module TLFI initiates a linking of the unit under test to a test coupler via a test bus. The test unit TU has access via the test couplers to all subscriber line circuits TA at a subscriber line unit DLU. The control of the test unit TU is assumed by a line-oriented test module control program module TUC. The messages coming from the test unit TU (potentially after pre-processing) are forwarded with events to the respective, central control program modules, for example TLFI or RBS, by the test module control program module TUC. For example, a subscriber line circuit/subscriber circuit, subscriber line TAL as well as a subscriber line circuit TA can be tested with the testing system. A subscriber circuit can implement the following functions: supplying a subscriber line circuit with operating voltage; protecting the switching equipment against over-voltage; 2/4 and 4/2 wire conversion; digital-to-analog and analog-to-digital conversion; signalling to and from telecommunication subscriber; coding; and test bus connection.

For such an implication the following tests are implemented by test routines: testing the operating voltage, attenuation, transhybrid loss, the symmetry, as well as the testing of the D/A–A/D conversion.

Figure 2:
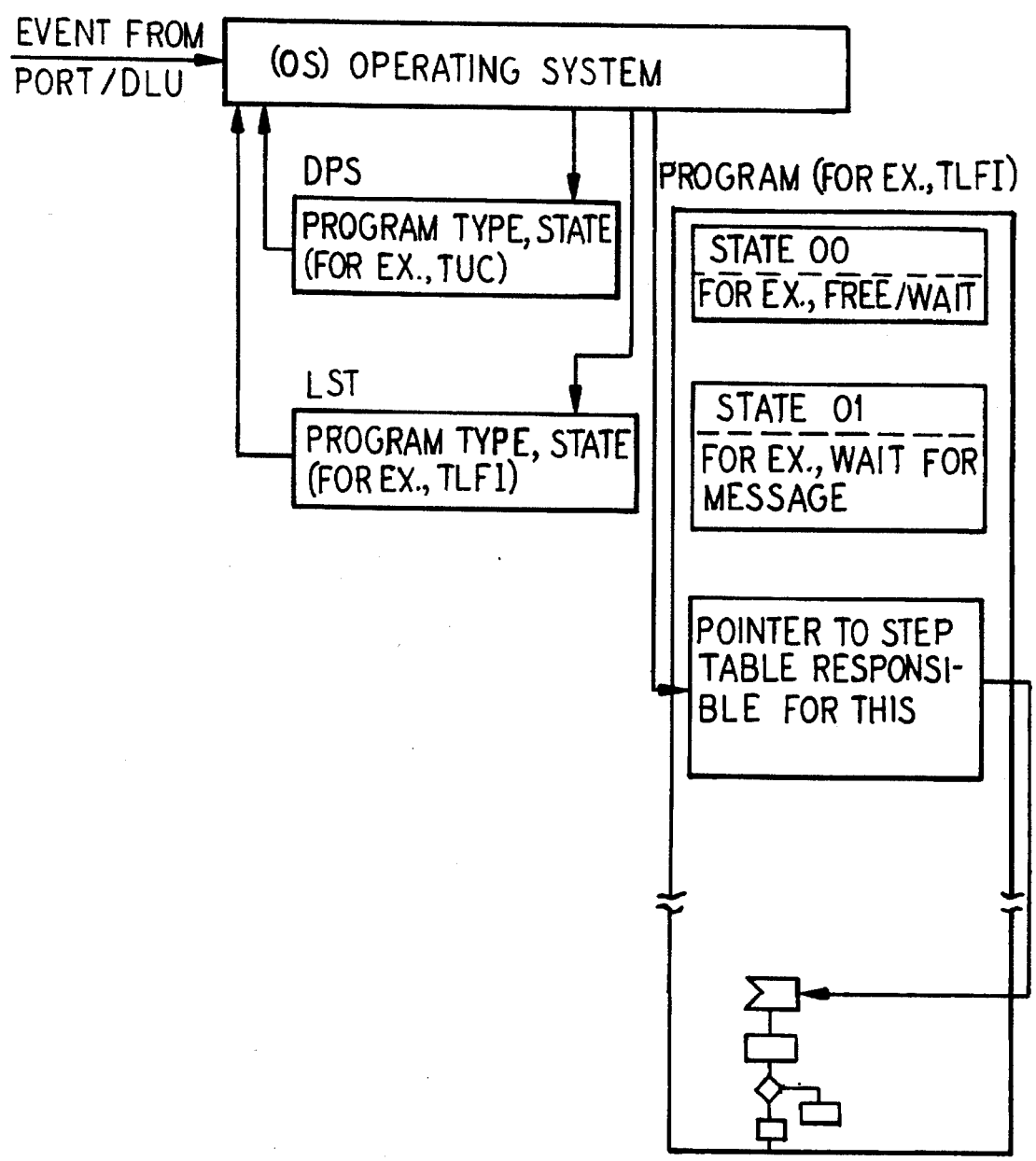
FIG. 2 is a schematic block illustration for processing events.

FIG. 2 shows a simplified block illustration for the processing of events. The events are thereby formed by a hardware or software event, for example initiation of a testing routine by the coordination processor CP. The operating system OS reads the applicable program types as well as their statuses, for example, waiting for result, test unit TU, occupation or time slot allocation, from device memory tables DPS for processing the accepted events. The device memory tables DPS each respectively contain data such as, for example, program type and program status of the program such as, for example, the test module control program module TUC linked to the device memory tables DPS. In a first event-processing step, the operating system initiates program-oriented steps that read the events from the test modules FTEM, LMEM, LVMM. In a following program procedure, the operating system respectively reads the program type and the status thereof from the device memory tables DPS of the subscriber line unit DLU. After selection of a program module, for example the test module control program module TUC, an address of a sub-program routine to be implemented is addressed) via conversion tables on the basis of the data noted in operation fields to which the operating system OS has access.

Figure 3:
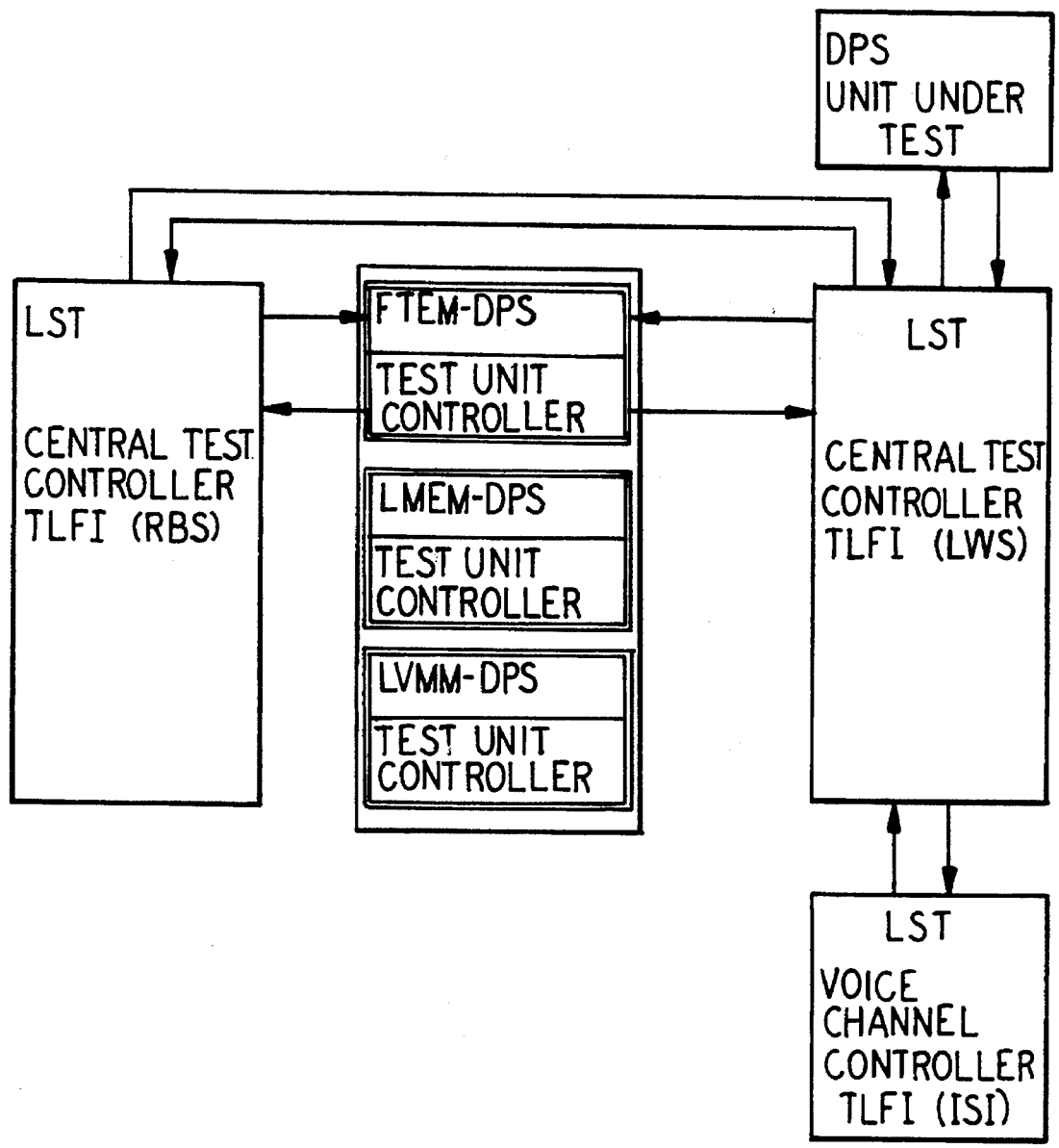
FIG. 3 is a schematic illustration of an occupation of device memory tables.

FIG. 3 shows a schematic illustration of an occupation of device memory tables DPS, LST. Respective program modules noted therein assume the actual handling of the processing of the switching-oriented as well as testing-oriented jobs or procedures. In order to be able to designationally address these, a number of algorithms are executed in the operating system. The interface between the program module and the group processor operating system is essentially formed by the device memory tables, for example LST, DPS, as well as the subdivisions thereof. For example, the device memory table (DLU port status table) DPS thus contains variable data which can be accessed both by the test module control program module TUC as well as by the operating system OS. For example, a current status (status address) is noted here by the test module control program module TUC dependent on the events to be anticipated, for example reply of a test module FTEM or reply to a time slot allocation. The device memory table DPS for the subscriber line unit DLU is referred to as DLU port status table.

Figure 4B:
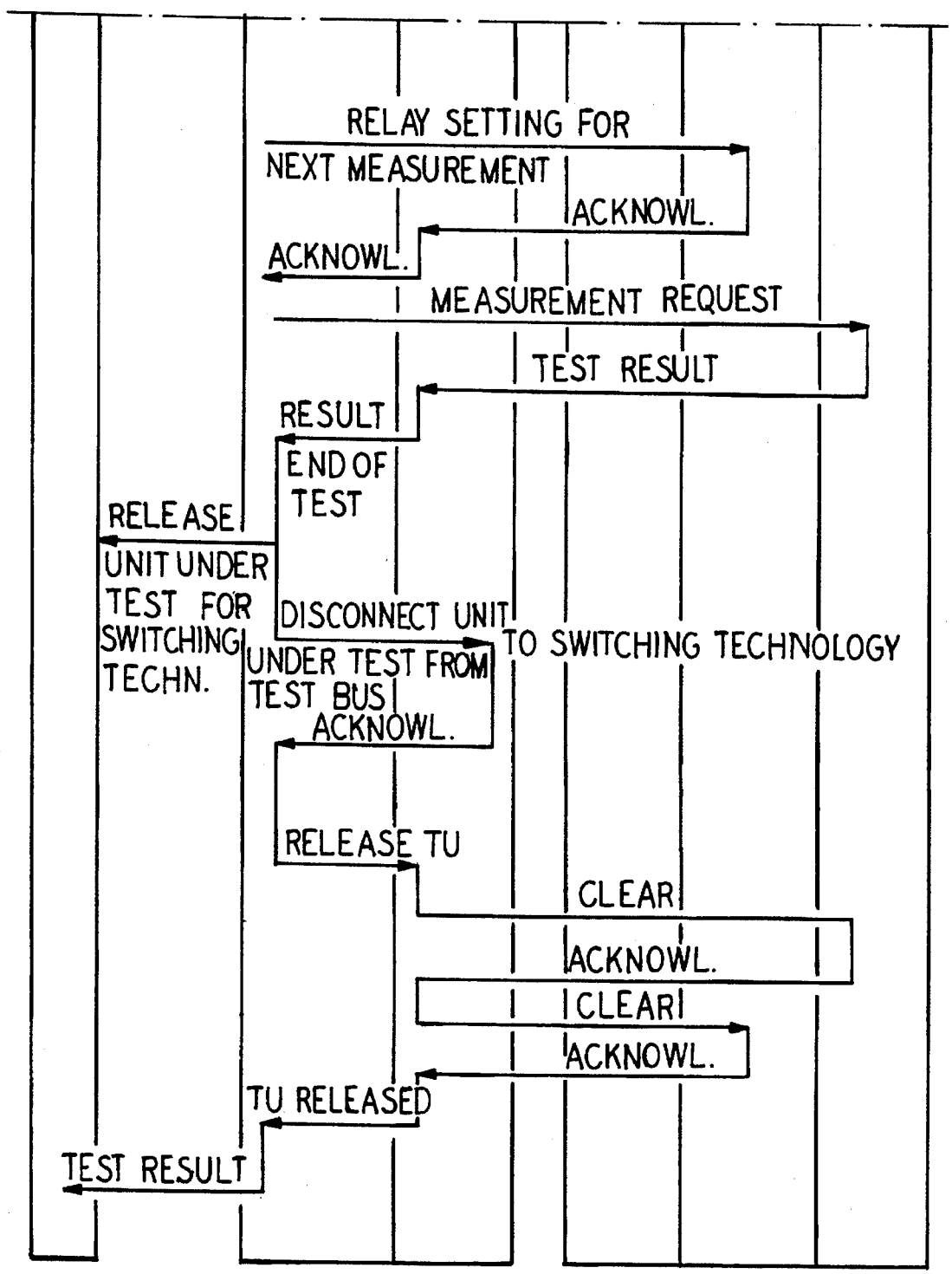

FIG. 4A and 4B depict a flowchart for illustrating a few significant program-oriented steps during a testing routine. All critical steps to be initiated and implemented before the testing procedure are thereby executed by the test module control program module TUC. All of the events sent by the test modules combined in the testing unit TU, for example a testing module FTEM, a line measuring module for subscriber line units DLU for a digital subscriber line unit FTEm, LMEM, as well as a level-measuring module for a subscriber line unit for a digital subscriber line unit LVMM or a function testing module of the testing unit TU are processed with the test module control program module TUC. The assembly modules FMTU and LCMM recited in FIG. 4a/b corresponding to a second generation of testing modules and replace the testing modules FMEM (FMTU), LMEM (LCMM) and LVMM (LCMM) employed in a first generation. The executive sequences for seizing and releasing the testing unit TU are sequenced under TUC control by the central control program module TLFI after reception of the respective event. The executive sequences for seizing and releasing are no longer monitored by the central control program module TLFI. The central control program module TLFI only monitors whether the test module control program module TUC performs the required jobs with the totality of individual steps necessary therefor within a prescribed time. During operation (the time between successful seizure of the testing unit TU and the beginning of the release procedure), the messages coming from the testing unit TU (potentially after a pre-processing) are forwarded by the TUC to the respective sub-program modules on the basis of corresponding events. In program-oriented terms, the operating system OS makes available specific data from the operation tables TO fields to the programs that are called in, the TUC employing these from the very beginning in the sub-program modules to be implemented.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A control method for a testing system in a processor-controlled telecommunications system, comprising the steps of:

arranging at least one central control program module in a group processor of a line trunk group and connecting via a testing unit, subdivided into test modules, to a unit under test;

providing device memory tables in the line trunk group, the device memory tables being associated with the test modules;

initiating a line-oriented test module control program module by the central control program module;

entering the test module control program module into each of the device memory tables;

storing data generated by the test modules in the device memory tables, said stored data in the device memory tables also being accessable by the group processor for executing switching-oriented and test-oriented procedures; and updating by means of the test module control program module in the initiating step a respective current program status in the device memory tables of the test modules after a conclusion of a testing routine.

2. The control method according to claim 1, wherein the method further comprises the test module control program module communicating with the test modules arranged on the line trunk group, and initiating and implementing corresponding test procedures.

3. The control method according to claim 1, wherein the method further comprises time-monitoring the test module control program module by the central control program module.

4. The control method according to claim 1, wherein the method further comprises implementing individual test jobs that are controlled in state-event fashion.

5. The control method according to claim 1, wherein the device memory tables belonging to the testing unit are updatable memories.

6. A control method for a testing system in a processor-controlled telecommunications system, comprising the steps of:

arranging at least one central control program module in a group processor of a line trunk group and connecting via a testing unit, subdivided into test modules, to a unit under test;

providing device memory tables in the line trunk group, the device memory tables being associated with the test modules;

initiating a line-oriented test module control program module by the central control program module, the test module control program module communicating with the test modules arranged on the line trunk group, and initiating and implementing corresponding test procedures;

entering the test module control program module into each of the device memory tables;

storing data generated by the test modules in the device memory tables, said stored data in the device memory tables also being accessable by the group processor for executing switching-oriented and test-oriented procedures; and updating by means of the test module control program module in the initiating step a respective current program status in the device memory tables of the test modules after a conclusion of a testing routine.

7. The control method according to claim 6, wherein the method further comprises time-monitoring the test module control program module by the central control program module.

8. The control method according to claim 6, wherein the method further comprises implementing individual test jobs that are controlled in state-event fashion.

9. The control method according to claim 6, wherein the device memory tables belonging to the testing unit are updatable memories.

10. A control method for a testing system in a processor-controlled telecommunications system, comprising the steps of:

arranging at least one central control program module in a group processor of a line trunk group and connecting via a testing unit, subdivided into test modules, to a unit under test;

providing device memory tables in the line trunk group, the device memory tables being associated with the test modules;

initiating a line-oriented test module control program module by the central control program module;

entering the test module control program module into each of the device memory tables, the device memory tables being updatable memories;

storing data generated by the test modules in the device memory tables, said stored data in the device memory tables also being accessable by the group processor for executing switching-oriented and test-oriented procedures; and updating by means of the test module control program module in the initiating step a respective current program status in the device memory tables of the test modules after a conclusion of a testing routine;

wherein a plurality of individual test jobs are implemented and are controlled in state-event fashion.

11. The control method according to claim 10, wherein the method further comprises the test module control program module communicating with the test modules arranged on the line trunk group, and initiating and implementing corresponding test procedures.

12. The control method according to claim 10, wherein the method further comprises time-monitoring the test module control program module by the central control program module.

* * * * *